United States Patent
Baltes

(10) Patent No.: US 7,173,926 B2
(45) Date of Patent: Feb. 6, 2007

(54) METHOD TO ELIMINATE USER SETUP FOR INSTALLATION OF BROADBAND MODEMS, ROUTERS, AND INTEGRATED MODEM-ROUTERS

(75) Inventor: Wolfgang Baltes, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 959 days.

(21) Appl. No.: 10/011,020

(22) Filed: Dec. 4, 2001

(65) Prior Publication Data

US 2003/0103615 A1 Jun. 5, 2003

(51) Int. Cl.
*H04L 12/66* (2006.01)

(52) U.S. Cl. ...................... 370/352; 370/401
(58) Field of Classification Search ............... 370/352, 370/465, 468, 254
See application file for complete search history.

(56) References Cited

U.S. PATENT DOCUMENTS

| | | | | |
|---|---|---|---|---|
| 6,012,100 A | * | 1/2000 | Frailong et al. | 709/250 |
| 6,065,049 A | * | 5/2000 | Beser et al. | 709/218 |
| 6,560,704 B2 | * | 5/2003 | Dieterman et al. | 713/100 |
| 6,636,505 B1 | * | 10/2003 | Wang et al. | 370/352 |
| 7,012,899 B1 | * | 3/2006 | Hagler et al. | 370/252 |
| 7,079,527 B2 | * | 7/2006 | Owens | 370/352 |
| 2002/0004935 A1 | * | 1/2002 | Huotari et al. | 717/11 |
| 2003/0053443 A1 | * | 3/2003 | Owens | 370/352 |
| 2003/0061315 A1 | * | 3/2003 | Jin | 709/220 |
| 2003/0101243 A1 | * | 5/2003 | Donahue et al. | 709/220 |
| 2004/0047358 A1 | * | 3/2004 | Chen et al. | 370/401 |

\* cited by examiner

*Primary Examiner*—Frank Duong

(57) ABSTRACT

A method for automatically configuring a broadband communication device is disclosed. An embodiment provides for a method in which a central server may be contacted when configuration information is needed for a broadband communication device. This contact may be initiated via a dial-up modem. Next, the central server uses caller-ID to identify the customer with the broadband communication device. Based on the caller-ID, the central server determines configuration information for the broadband communication device. For example, the central server may scan a number of Internet service provider databases for the proper configuration information for this user. Then, the configuration information is transferred over the dial-up communication link. Finally, the broadband communication device is automatically configured with the configuration information.

23 Claims, 5 Drawing Sheets

METHOD TO ELIMINATE USER SETUP FOR INSTALLATION OF BROADBAND MODEMS, ROUTERS, AND INTEGRATED MODEM-ROUTERS

TECHNICAL FIELD

The present invention relates to the field of broadband modems. Specifically, the present invention relates to a method for automatically installing a broadband modem, router, or integrated modem-router.

BACKGROUND ART

To access the Internet, customer premises network equipment (CPNE) such as broadband modems, routers, and modem-router combination products require being setup with connection specific information. This information may comprise an IP address, user authentication information, a communication type, a channel type, etc. This information (e.g., communication parameters) may be quite complex requiring the user to have substantial computer knowledge to correctly configure the modem. While a savvy computer user may be able to correctly configure the broadband modem, many users will have trouble, leading to customer dissatisfaction and increased customer support costs.

Furthermore, the type of setup information is specific to each Internet access service provider because each may use the modem protocol in a different way. Further complicating the configuration process is the fact that different providers may assign different names to a given configuration parameter. Even the same provider may assign different names to the same parameter.

Consequently, it is difficult to develop a simple set of instructions to walk the user through configuring CPNE. For example, a set of instructions may ask the user a series of if-then questions, with the user's answers determining what questions will be asked next. Clearly, if the user responds incorrectly, the wrong branch of follow up questions is asked and the process is likely to fail.

One conventional attempt to solve these problems is to require the user to visit a web site of the CPNE vendor or to call the vendor. The user is provided with a code which is unique to the customer's broadband service provider. This code is then used during the CPNE setup process to reduce the number of setup fields and choices to the ones that are relevant for the specific provider. However, the customer still faces the problem of difficult nomenclature, as well as the possibility of making mistakes leading to a failed installation.

Accordingly, the present invention provides a method and system for automatically installing customer premise network equipment, such as a broadband modem, router, or integrated modem-router. The present invention does not require user intervention such as the user placing phone calls, accessing web sites, or manually entering parameters. These and other advantages of the present invention will become apparent within discussions of the present invention herein.

DISCLOSURE OF THE INVENTION

A method for automatically configuring a broadband communication device is disclosed. An embodiment provides for a method in which a central server may be contacted when configuration information is needed to install a broadband communication device. This contact may be initiated via a dial-up modem. Next, the central server may use caller-ID to identify the customer with the broadband communication device. Based on the caller-ID, the central server determines configuration information for the broadband communication device. For example, the central server may scan a number of Internet service provider databases for the proper configuration information for this user. Then, the configuration information is transferred over the dial-up communication link. Finally, the broadband communication device is automatically configured with the configuration information.

In one embodiment, the above-mentioned contact to the central server may be initiated by the broadband communication device itself. For example, upon connection to a broadband connection, a phone line, and power, the broadband communication device automatically calls the central server. In another embodiment, the contact is initiated by a personal computer connected to the broadband communication device.

In one embodiment, once the parameters are received, the configuration may be performed by the broadband communication device itself. In another embodiment, the configuration is performed by a computer connected to the broadband communication device.

Another embodiment provides for a system for automatically configuring a broadband communication device. The system comprises a central server and logic for automatically using a dial-up modem to communicate with the server when the broadband communication device needs to be configured. The server is able to determine the source of the communication received via the dial-up link. For example, the server uses caller-ID to determine who the customer is. The server is further able to search for the configuration information based on the caller-ID. Finally, the server is able to transfer the configuration information over the dial-up communication link, wherein the configuration information is available to configure the broadband communication device.

In another embodiment, the broadband communication device, upon determining configuration information is needed, is able to automatically contact the server with a dial-up modem. In an alternative embodiment, a peripheral computer coupled to the broadband communication device, has software operable to automatically establish a connection via a dial-up modem if configuration information is necessary for the broadband communication device.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

Figure 1:
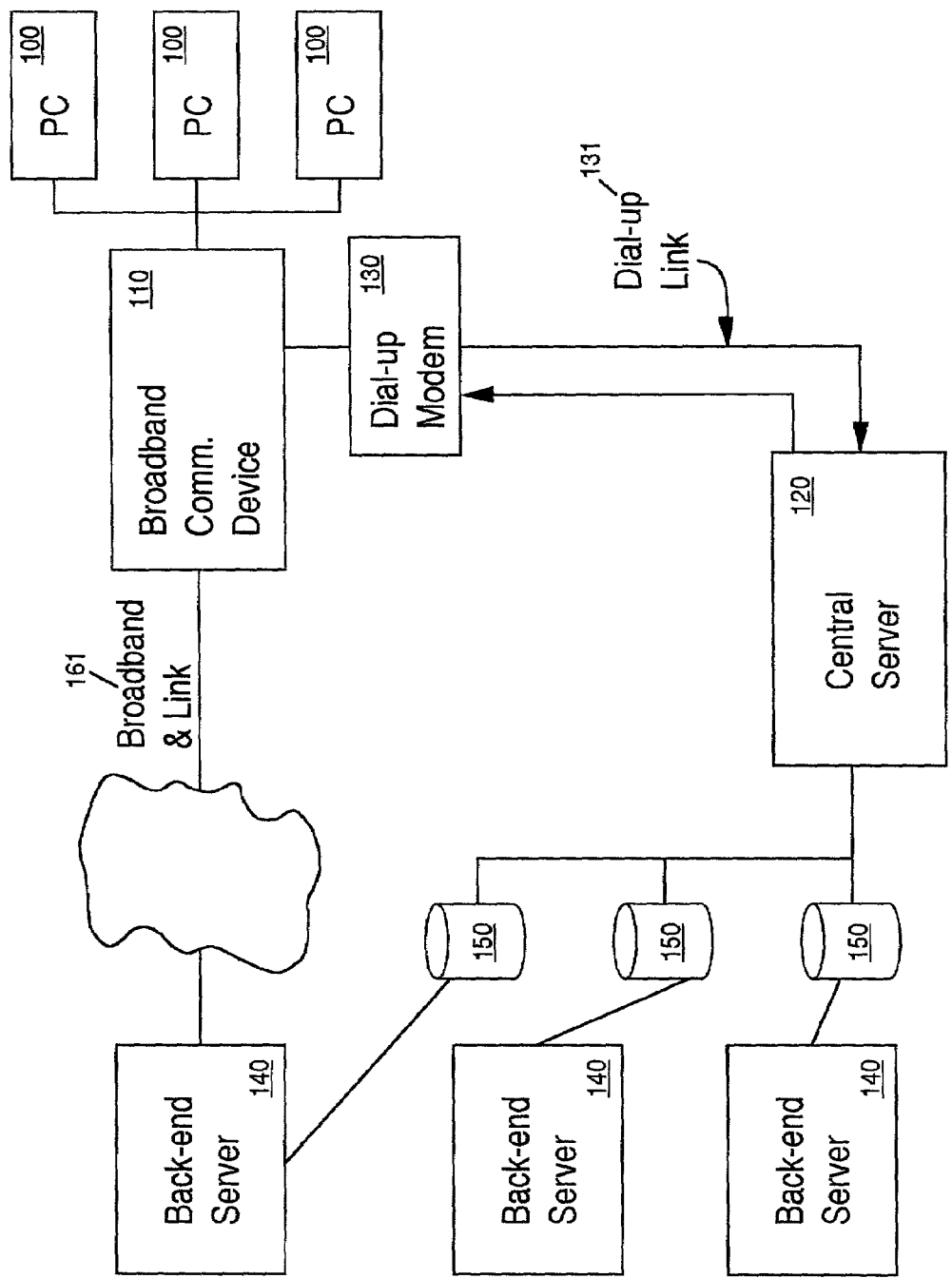
FIG. 1 is a diagram illustrating the flow of information in automatically configuring a broadband communication device, according to embodiments of the present invention.

Referring to FIG. 1, customer premises network equipment 110 (CPNE) is shown connected to a dial-up modem 130 and a personal computer (PC) 100. The CPNE 110 or broadband communication device 110 may be a device such as, for example, a broadband modem, a router, or a router-modem combination. The CPNE 110 may also be known as a gateway device, which may function to allow multiple electronic devices (e.g., personal computers 100) to share a communication link (e.g., broadband link 161). Throughout this application, the term broadband communication device 110 may mean a device operable to communicate over a broadband communication link, such as, a broadband modem, a router, a router-modem combination, gateway device, or the like. While shown in FIG. 1 as a single integrated unit, the broadband communication device 110 may comprise multiple separate units. In order to establish a connection to the back-end server 140, the broadband communication device 110 may need to be configured with various parameters. Furthermore, in order to share the broadband communication link 161 among multiple PCs 100, the broadband communication device 110 may need to be configured with parameters related to the broadband communication link 161.

If the broadband communication device 110 needs to be configured, the dial-up modem 130 may be used to contact the central server 120, which transfers the needed configuration information (e.g., parameters) back over the dial-up link 131. For example, the broadband communication device 110 itself may determine that it needs to be configured. Without any further user intervention, the broadband communication device 110 will use the dial-up modem 130 to contact the central server 120 via a telephone number that may be pre-loaded in the broadband communication device 110. For example, upon the broadband communication device 110 having access to a broadband communication interface 161, a telephone link 131, and power, the central server 120 is contacted via the telephone connection 131. For example, a toll-free number may be used to prevent any phone charges to the user, and simplify complications of long-distance dialing, such as access codes. However, it is not required that the broadband communication device 110 initiate the call to the central server 120, for example, a PC 100 may do so.

The central server 120 then determines who the customer is through an identification of the source of the communication. For example, the central server 120 uses a caller-identification as is provided in a conventional telephone call (e.g., caller-ID). However, the present invention is not limited to this technique. For example, an identifier provided by the Internet service provider may be passed or the customer may be given a Smartcard, which may pass an identifier. Furthermore, a broadband communication device 110 serial number may be provided to the central server 120. More generally, the dial-up modem 130 may be any device which provides a communication link to the central server 120, and by which the customer may be automatically identified.

The central server 120 is able to access a number of databases 150 that contain configuration information for the customer. In this embodiment, it is assumed that the customer has already established service with an Internet access service provider (IASP). After doing so, the IASP stores information on its database 150 which is used for configuring the broadband communication device 110. The central server 120 may scan each database 150 until it finds the customer's information. Any suitable information from the caller-ID may be used, such as, for example, the customer's name, telephone number, or other information to identify the customer. Thus, based solely on the caller-ID, this embodiment may find the configuration information.

Then central server 120 downloads the configuration information from the database 150. Then, it transfers the configuration information over the dialup communication link 131. Once the configuration information is at the broadband communication device 110, the broadband communication device 110 may use the information to configure itself. However, it is not required that the broadband communication device 110 configure itself. For example, the PC 100 may be used to configure the broadband communication device 110.

Figure 2A:
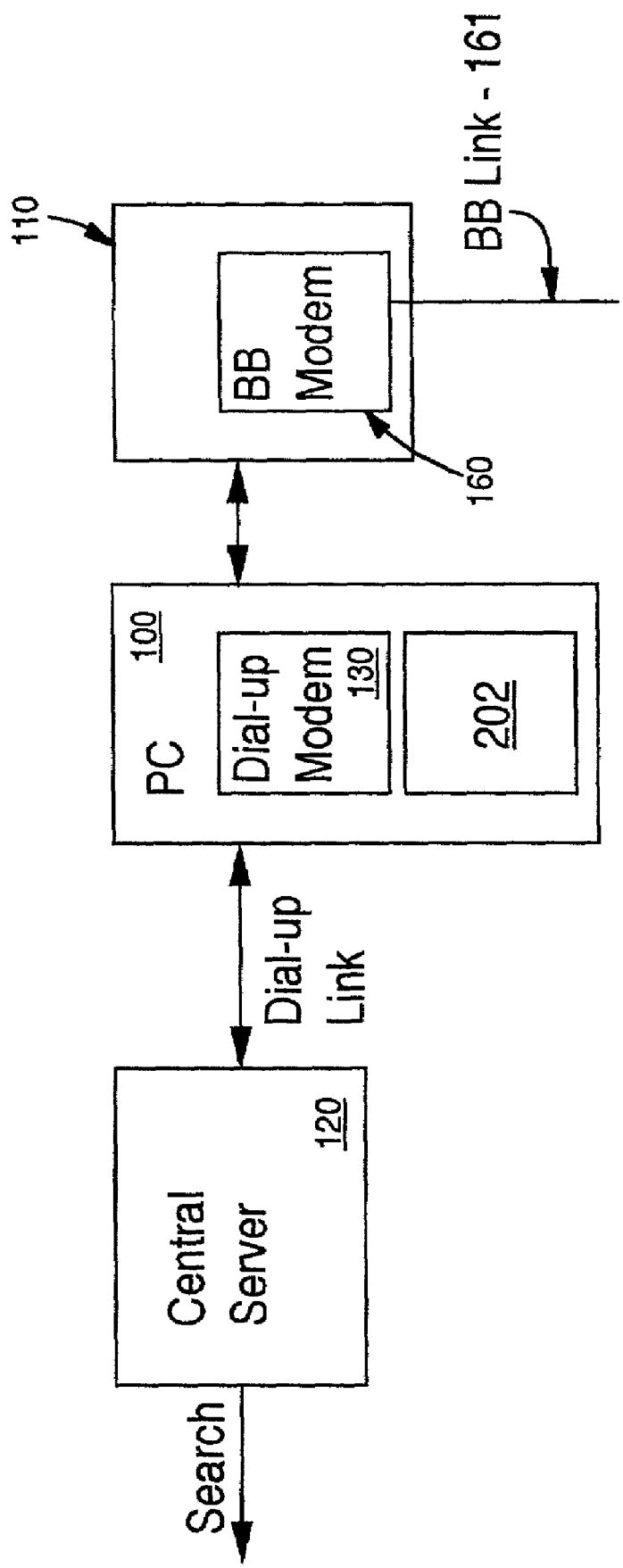
FIG. 2A, FIG. 2B, and FIG. 2C are diagrams illustrating systems for automatically configuring a broadband communication device, according to embodiments of the present invention.

FIG. 2A shows a system for configuring a broadband communication device 110. In this embodiment, the broadband communication device 110 contains a broadband modem 160 and the PC 100 contains the dial-up modem 130. For example, the broadband communication device 110 may be a modem-router combination, although this is not required. In this embodiment, there may be software 202 or other logic on the PC 100 to assist in the configuration of the broadband communication device 110 and/or the broadband modem 160. This software 202 may have been provided to the user when the broadband communication device 110 was purchased. Thus, in this embodiment, it is the PC 100 which uses the dial-up modem 130 to contact the central server 120 and configures the broadband communication device 110 and/or the broadband modem 160. Alternatively, the dial-up modem 130 may be external to the PC 100, but controlled by the PC 100.

Figure 2B:
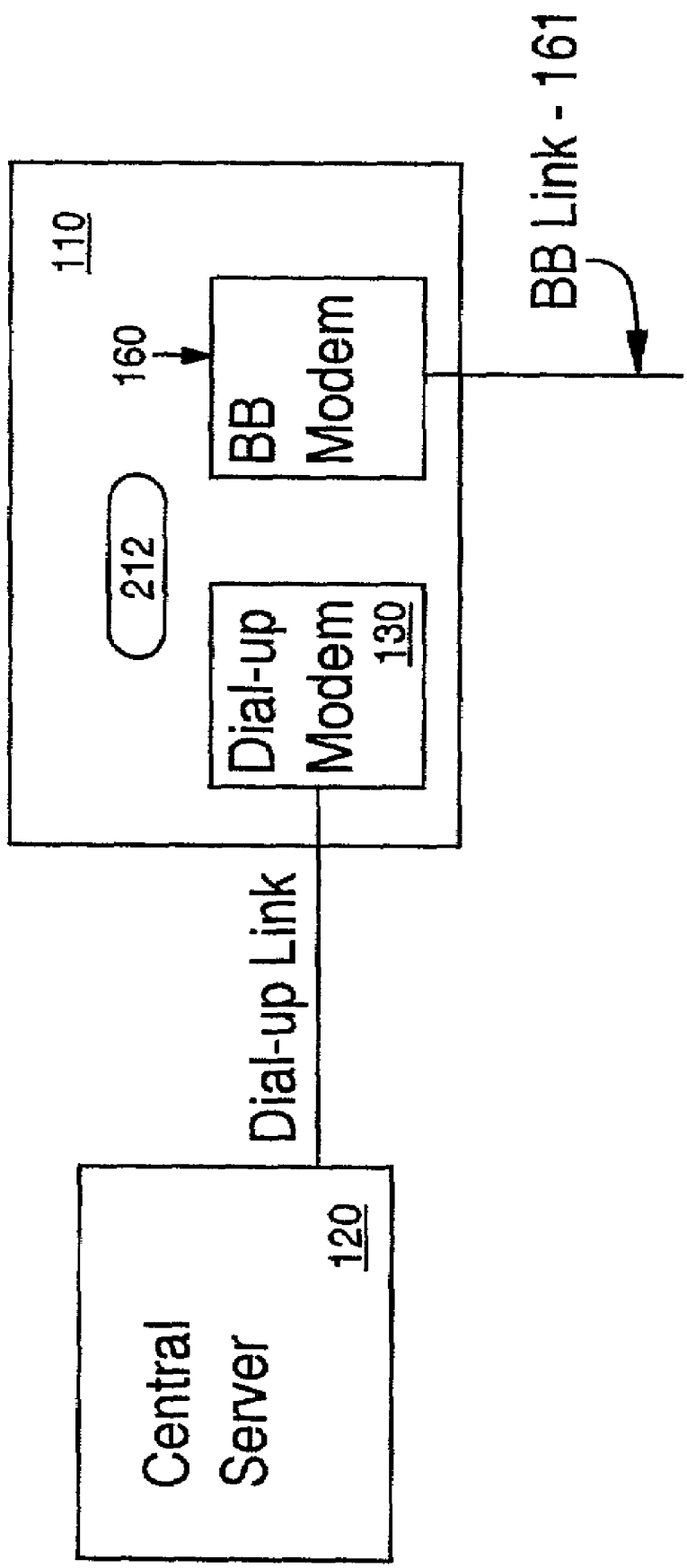

In FIG. 2B is an embodiment in which the broadband communication device 110 contains both a broadband modem 160 and a dial-up modem 130. In this embodiment, the broadband communication device 110 initiates the call to the central server 120 and configures itself 110 and/or the broadband modem 160 with the returned information. The broadband communication device 110 may comprise logic 212 for performing the configuration.

Figure 2C:
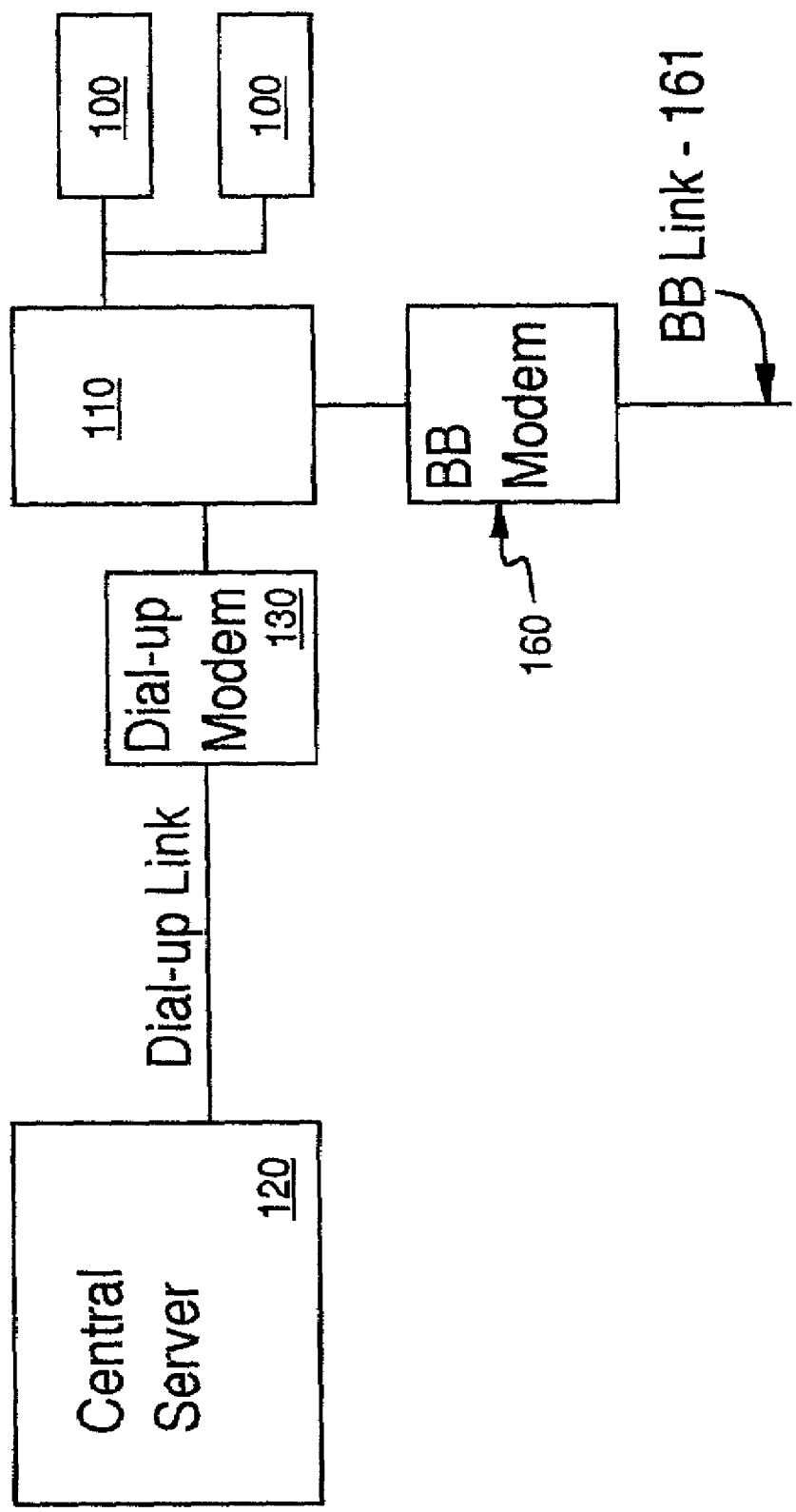

FIG. 2C shows an embodiment in which the broadband communication device 110 (e.g., a gateway device) is connected to an external broadband modem 160 and a dial-up modem 130. In this embodiment, the gateway 110 initiates the call to the central server 120 and configures itself 110 and/or the broadband modem 160 with the returned information. It will be understood that other hardware configurations may be used according to the present invention.

Figure 3:
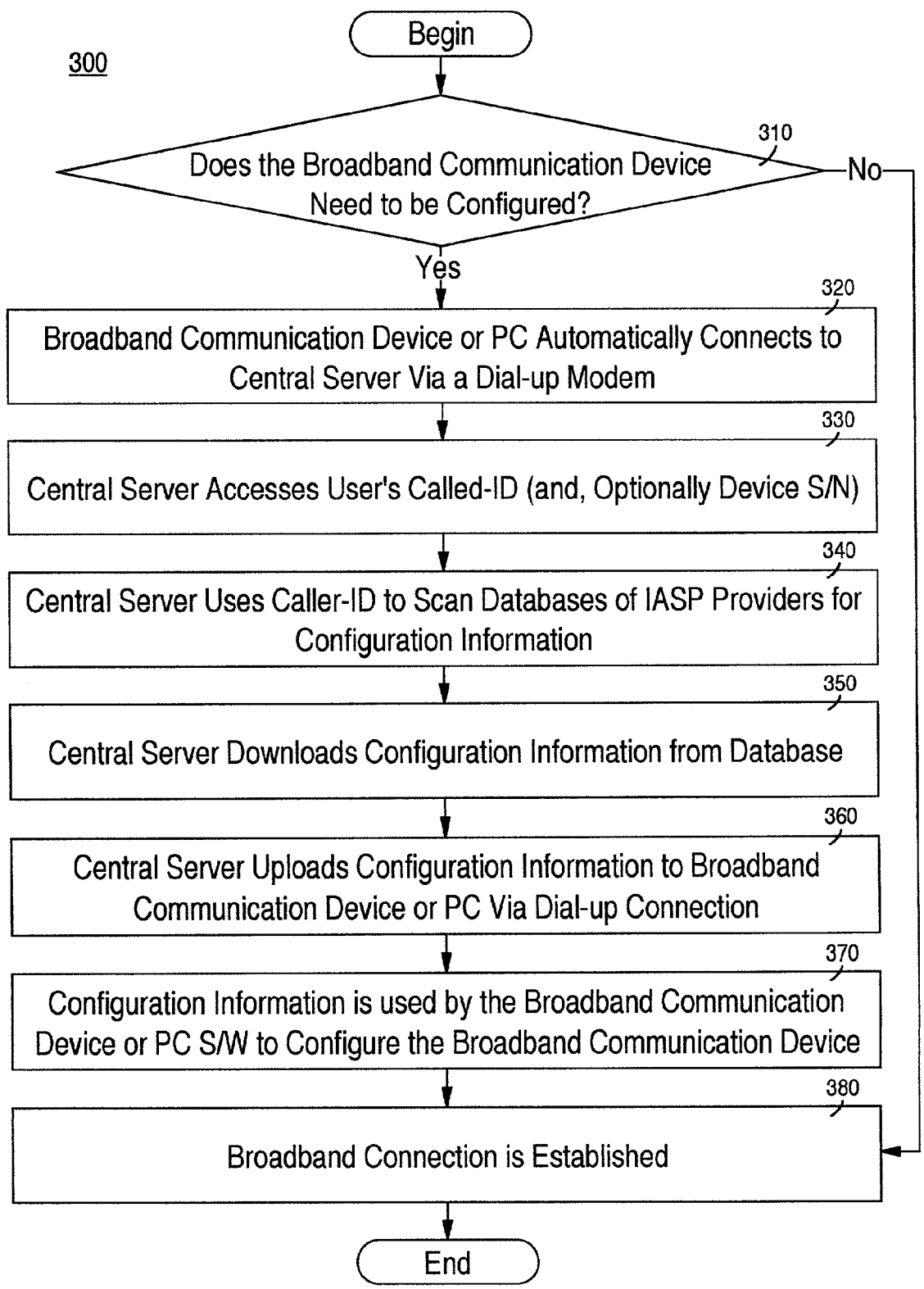
FIG. 3 is a flowchart illustrating steps of a process of automatically configuring a broadband communication device, according to embodiments of the present invention.

An embodiment of the present invention provides for a method of configuring a broadband communication device 110 and is illustrated in steps of process 300 in FIG. 3. In step 310, a determination is made as to whether the broadband communication device 110 needs configuration information. This may be made by the broadband communication device 110 itself, by a PC 100 it is connected to, etc. If not, the process 300 jumps to establishing a broadband connection 161.

If the broadband communication device 110 needs to be configured, then the broadband communication device 110 or the PC 100 automatically connects to the central server 120 via a dial-up modem 130, in step 320. For example, upon the broadband communication device 110 having access to a broadband communication interface 161, a telephone link 131, and power, the central server 120 is contacted via the telephone connection 131.

In step 330, the central server 120 accesses user information. For example, this may be a caller-ID to identify the customer. In addition, or alternatively, this information may be device information, such as, for example, a broadband communication device 110 serial number.

In step 340, the central server 120 scans databases 150 for configuration information. The scan may use a telephone number, customer name, or any other suitable data from the caller-ID. In one embodiment, the user identifier contains information to limit the geographic region in which the user may be located. For example, the user's telephone number contains an area code and exchange. This allows the central server 120 to limit the databases 150 searched to those which could possibly provide Internet access in the customer's region.

In step 350, the central server 120 downloads the information to the central server 120. If required, additional processing of the configuration information may be done at this step. For example, the central server 120 may use the broadband communication device 110 serial number to modify the information received from the database 150. Alternatively, the information from the database 150 may not be fully suitable for transfer to the customer. For example, the database 150 may only contain the most essential information with the central server 120 supplying the rest.

In step 360, the central server 120 uploads the configuration information via the dial-up communication link 131.

Then, in step 370, the configuration information is used to configure the broadband communication device 110. Significantly, the user has not been required to enter any information to complete this configuration or installation process.

Finally, a broadband connection 161 to the back-end server 140 is established, in step 380.

The preferred embodiment of the present invention, a method and system for automatically configuring a broadband communication device, is thus described. While the present invention has been described in particular embodiments, it should be appreciated that the present invention should not be construed as limited by such embodiments, but rather construed according to the below claims.

What is claimed is:

1. A method of automatically providing configuration information for a broadband communication device, said method comprising:
   communicatively coupling a broadband communications device with a computing system;
   receiving, from said computing system communicatively coupled with said broadband communications device, an automatically generated communication via a communication link between a server and said computing system, said automatically generated communication not requiring any user interaction or user entered information;
   identifying a source of said communication;
   based on said source of said communication, determining configuration information for said broadband communication device; and
   sending said configuration information over said communication link, to said computing device, wherein said configuration information is automatically provided to said broadband communications device from said computing device.

2. A method as described in claim 1 further comprising:
   receiving said communication via a dial-up communication link.

3. A method as described in claim 1 further comprises:
   utilizing a telephone caller identification function to identify said source of said communication.

4. A method as described in claim 1 further comprising:
   determining said configuration information using a product identifier for said communication device, said product identifier provided in said communication.

5. A method as described in claim 1 further comprising:
   identifying a geographic region of the source of said communication; and
   c) comprises determining said configuration information for said communication device based on said geographic region.

6. A method as described in claim 1 further comprising:
   scanning a plurality of databases for configuration information for said communication device.

7. A method of configuring a broadband communication device, said method comprising:
   a) upon determining that configuration information is needed for said communication device, automatically contacting a server via a communication link; without requiring any user interaction or user entered information;
   b) identifying a source of said communication by providing a serial number of said communications device to said server;
   c) determining configuration information for said communication device based on said source identified by said number;
   d) transferring said configuration information over said communication link; and
   e) automatically configuring said communication device with said configuration information.

8. A method as described in claim 7, wherein a) comprises said communication device automatically contacting said server via a dial-up modem.

9. A method as described in claim 7, wherein c) comprises scanning a plurality of databases for configuration information.

10. A method as described in claim 7, wherein a) comprises a peripheral computer coupled to said communication device automatically contacting said server over said communication link via a dial-up modem.

11. A method as described in claim 7, wherein e) comprises said communication device automatically configuring itself with said configuration information.

12. A method as described in claim 7, wherein e) comprises a software program in a peripheral computer automatically configuring said communication device with said configuration information.

13. A method as described in claim 7, wherein c) comprises limiting said scan based on a geographic region of said source of said communication.

14. A method as described in claim 7, wherein c) further comprises determining said configuration information based on a communication device identifier.

15. A system for automatically configuring a broadband communication device, comprising:
- a server;
- logic operable to automatically use a dial-up modem to communicate with said server when said broadband communication device needs to be configured for broadband communication without requiring any user interaction or user entered information;
- said server receiving a serial number of said broadband communications device to identify said broadband communications device
- said server further operable to search for said configuration information based on the ser number of said broadband communications device; and
- said server further operable to transfer said configuration information to the source of said communication, wherein said configuration information is available to configure said broadband communication device.

16. The system of claim 15, wherein said logic is implemented within said broadband communication device, wherein said broadband communication device is operable to determine whether said configuration information is necessary and, if so, to automatically contact said server.

17. The system of claim 15, wherein said broadband communication device comprises a stored telephone number with which to contact said server.

18. The system of claim 15, wherein said logic is further operable to automatically configure said broadband communication device with said configuration information.

19. The system of claim 15, wherein said logic is implemented by software on a peripheral computer coupled to said broadband communication device.

20. The system of claim 19, wherein said software is further operable to automatically configure said broadband communication device upon reception of said configuration information.

21. The system of claim 15, wherein said broadband communication device is operable to automatically configure itself upon reception of said configuration information.

22. The system of claim 15, wherein said server is further operable to search a plurality of databases for said configuration information based on the telephone number of the source of said communication placed via said dial-up modem.

23. The system of claim 15, wherein said server is further operable to search a plurality of databases for said configuration information based on a customer name of the source of said communication placed via said dial-up modem.

* * * * *

UNITED STATES PATENT AND TRADEMARK OFFICE
CERTIFICATE OF CORRECTION

PATENT NO.        : 7,173,926 B2
APPLICATION NO.   : 10/011020
DATED             : February 6, 2007
INVENTOR(S)       : Wolfgang Baltes It is certified that error appears in the above-identified patent and that said Letters Patent is hereby corrected as shown below:

In column 6, line 22, in Claim 5, delete "c)" before "comprises".

In column 6, line 32, in Claim 7, delete "link;" and insert -- link --, therefor.

In column 6, line 40, in Claim 7, after "said" insert -- serial --.

In column 7, line 11, in Claim 15, delete "device" and insert -- device; --, therefor.

In column 7, line 13, in Claim 15, delete "ser" and insert -- serial --, therefor.

In column 8, line 18, in Claim 22, delete "the" and insert -- a --, therefor.

Signed and Sealed this

Sixteenth Day of June, 2009

JOHN DOLL
*Acting Director of the United States Patent and Trademark Office*